US009599152B2

(12) United States Patent
Freeman et al.

(10) Patent No.: US 9,599,152 B2
(45) Date of Patent: Mar. 21, 2017

(54) COMPACT SQUEEZE FILM DAMPER BEARING

(71) Applicant: SOLAR TURBINES INCORPORATED, San Diego, CA (US)

(72) Inventors: Jess Lee Freeman, Poway, CA (US); David Howard Moulton, Poway, CA (US); William Courtney Krehbiel, San Marcos, CA (US)

(73) Assignee: Solar Turbines Incorporated, San Diego, CA (US)

( * ) Notice: Subject to any disclaimer, the term of this patent is extended or adjusted under 35 U.S.C. 154(b) by 407 days.

(21) Appl. No.: 14/257,692

(22) Filed: Apr. 21, 2014

(65) Prior Publication Data

US 2015/0300406 A1  Oct. 22, 2015

(51) Int. Cl.
| F01D 5/04 | (2006.01) |
| F16C 27/02 | (2006.01) |
| F04D 29/057 | (2006.01) |
| F04D 29/66 | (2006.01) |
| F16F 15/023 | (2006.01) |
| F16C 17/03 | (2006.01) |

(52) U.S. Cl.
CPC ............ *F16C 27/02* (2013.01); *F04D 29/057* (2013.01); *F04D 29/668* (2013.01); *F16F 15/0237* (2013.01); *F16C 17/03* (2013.01)

(58) Field of Classification Search
CPC ...... F04D 29/057; F04D 29/668; F16C 17/03; F16C 27/02; F16F 15/0237
See application file for complete search history.

(56) References Cited

U.S. PATENT DOCUMENTS

| 4,134,309 | A | | 1/1979 | Balke et al. |
| 4,214,796 | A | | 7/1980 | Monzel et al. |
| 4,553,855 | A | * | 11/1985 | De Choudhury ....... F16C 27/02 384/215 |
| 4,781,077 | A | | 11/1988 | El-Sahfei |
| 4,971,457 | A | | 11/1990 | Carlson et al. |
| 5,085,521 | A | * | 2/1992 | Singh .................... F01D 25/164 384/150 |
| 5,110,257 | A | | 5/1992 | Hibner et al. |

(Continued)

FOREIGN PATENT DOCUMENTS

EP  2187072 A1  5/2010

OTHER PUBLICATIONS

Zeidan, Fouad Y., Application of Squeeze Film Dampers, Turbomachinery International, Sep./Oct. 1995, pp. 50-53.

(Continued)

*Primary Examiner* — Jesse Bogue
(74) *Attorney, Agent, or Firm* — Procopio, Cory, Hargreaves & Savitch, LLP (57) ABSTRACT

A bearing assembly for a rotary machine is disclosed herein. The bearing assembly includes a bearing housing, a squeeze film cylinder, a damper spring, and a journal bearing. The squeeze film cylinder is located within the bearing housing. The damper spring includes a first portion, a second portion, and a spring portion. The first portion is located proximal the first end. The second portion is located proximal the second end. The spring portion extends axially between the first portion and the second portion and is located within the bearing housing.

20 Claims, 4 Drawing Sheets

(56) References Cited

U.S. PATENT DOCUMENTS

| | | | |
|---|---|---|---|
| 7,574,854 B2 | 8/2009 | Moniz | |
| 7,625,121 B2* | 12/2009 | Pettinato | F16C 17/03 |
| | | | 384/117 |
| 7,648,278 B2 | 1/2010 | Stout et al. | |
| 7,731,426 B2* | 6/2010 | Meacham | F01D 25/164 |
| | | | 384/311 |
| 8,083,413 B2 | 12/2011 | Ertas | |
| 8,182,153 B2 | 5/2012 | Singh et al. | |
| 8,182,156 B2 | 5/2012 | Kinnaird et al. | |
| 8,353,633 B2* | 1/2013 | Griffin | F16C 23/10 |
| | | | 384/215 |
| 8,425,118 B2* | 4/2013 | Yamashita | F16C 17/03 |
| | | | 384/99 |
| 8,894,286 B2* | 11/2014 | Nicholas | F16C 27/02 |
| | | | 384/125 |
| 2013/0051982 A1 | 2/2013 | Hindle et al. | |
| 2013/0089284 A1 | 4/2013 | Cazaux et al. | |
| 2013/0108440 A1* | 5/2013 | Do | F01D 25/164 |
| | | | 415/229 |
| 2013/0315523 A1 | 11/2013 | Bedenk | |

OTHER PUBLICATIONS

Zeidan, Fouad Y. et al., Design and Application of Squeeze Film Dampers in Rotating Machinery, Proceedings of the Twenty-Fifth Turbomachinery Symposium, Texas A&M Turbomachinery Laboratory, pp. 169-188, Texas A&M, College Station, TX, 1996.

* cited by examiner

COMPACT SQUEEZE FILM DAMPER BEARING

TECHNICAL FIELD

The present disclosure generally pertains to centrifugal gas compressors, and toward a compact squeeze film damper bearing for a centrifugal gas compressor.

BACKGROUND

Rotary machines, such as centrifugal gas compressors often rotate at high speeds. Bearing assemblies are generally provided in within the rotary machines to support the rotor and to dampen vibrations within the rotor. The bearing assemblies are often configured with a squeeze film damper, supported by a damper spring. A damper spring may more than double the axial length of the bearing assembly.

U.S. Pat. No. 8,083,413 issued to B. Ertas on Dec. 27, 2011 discloses a compliant hybrid gas journal bearing that includes compliant hybrid bearing pads having a hydrostatic recess and a capillary restrictor for providing a flow of pressurized gas to the bearing. The bearing also includes an inner rim adjacent the bearing pads, an outer rim and a damper bridge between the inner and outer rims. The damper bridge has an axial length that is less than an axial length of the bearing pads and the outer rim to form a damper cavity on each side of the damper bridge. An integral wire mesh damper is situated within the damper cavity on each side of the damper bridge. Integral centering springs are located between the inner and outer rims to provide radial and rotational compliance to the bearing pads. The oil-free bearing design addresses the low damping and load capacity characteristics that are inherent in present day compliant air foil bearing designs, while retaining the compliance to changes in rotor geometry.

The present disclosure is directed toward overcoming one or more problems discovered by the inventors or that is known in the art.

SUMMARY OF THE DISCLOSURE

A bearing assembly for a rotary machine is disclosed herein. In embodiments, the bearing assembly includes a bearing housing, a squeeze film cylinder, a damper spring, and a journal bearing. The bearing housing includes a housing body. The housing body is a solid of revolution with a hollow interior. The housing body includes a first end, and a second end opposite the first end.

The squeeze film cylinder is located within the bearing housing. The squeeze film cylinder includes a squeeze film cylindrical portion extending from proximal the first end towards the second end. The squeeze film cylindrical portion includes a hollow cylinder shape. The damper spring includes a first portion, a second portion, and a spring portion. The first portion is proximal the first end. The second portion is proximal the second end. The spring portion extends axially between the first portion and the second portion. The spring portion is located completely within the bearing housing. The journal bearing is located within the bearing housing.

DETAILED DESCRIPTION

The system disclosed herein includes a bearing assembly including a bearing housing, a squeeze film annulus for squeeze film damping, and a damper spring with a spring portion. In embodiments, the squeeze film annulus and the spring portion are axially located within the bearing housing. The axial location of the spring portion may reduce the overall length and footprint of the bearing assembly within a mechanical system, such as a centrifugal gas compressor.

Figure 1:
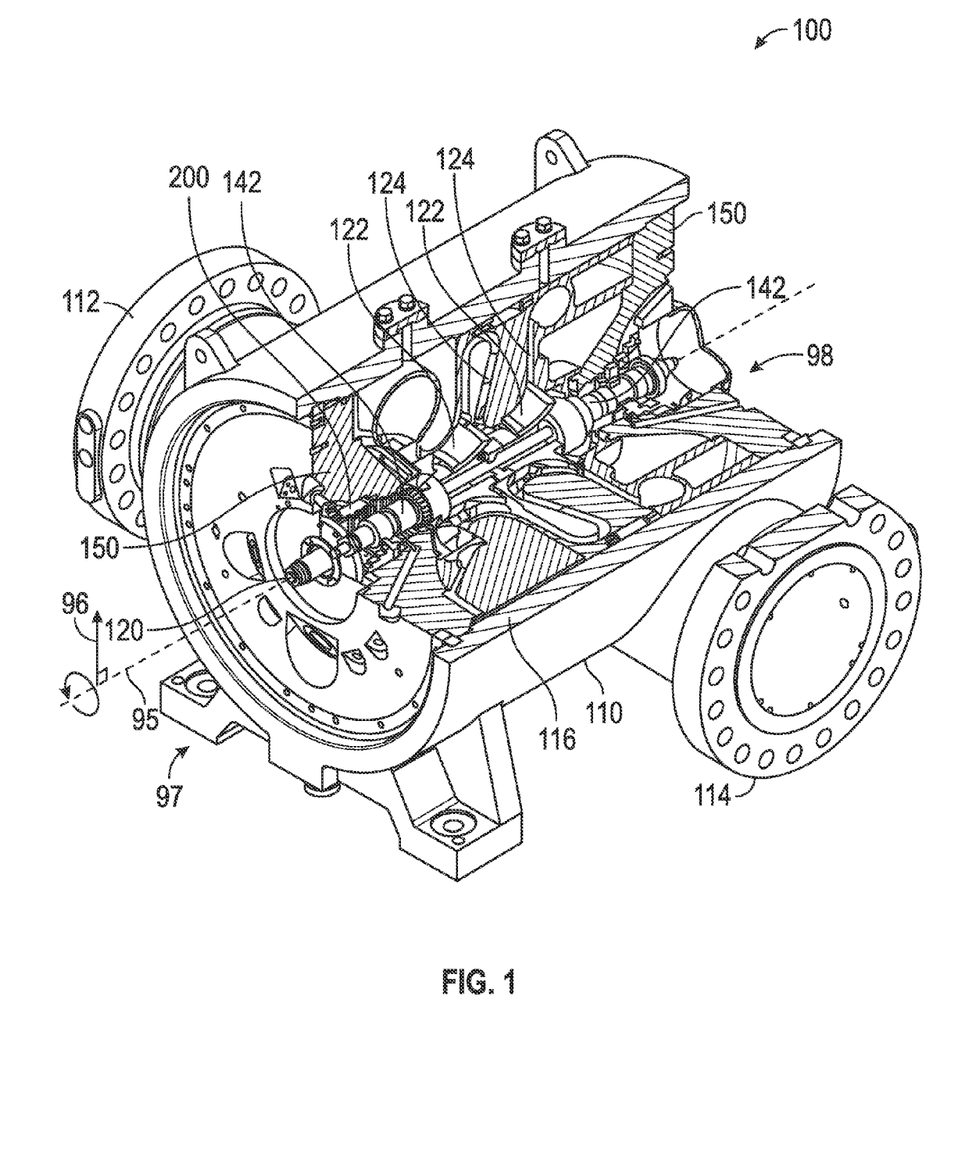
FIG. 1 is a cutaway illustration of an exemplary centrifugal gas compressor.

FIG. 1 is a cutaway illustration of an exemplary centrifugal gas compressor 100. Some of the surfaces have been left out or exaggerated (here and in other figures) for clarity and ease of explanation.

This disclosure may generally reference a center axis 95 of rotation of the centrifugal gas compressor, which may be generally defined by the longitudinal axis of its shaft 120. The center axis 95 may be common to or shared with various other concentric components of the centrifugal gas compressor 100. All references to radial, axial, and circumferential directions and measures refer to center axis 95, unless specified otherwise, and terms such as "inner" and "outer" generally indicate a lesser or greater radial distance from the center axis 95, wherein a radial 96 may be in any direction perpendicular and radiating outward from center axis 95.

In addition, this disclosure may reference a forward and an aft direction. Generally, all references to "forward" and "aft" are associated with the flow direction, relative to the center axis 95, of the compressed gas. In particular, the suction end 97 of the centrifugal gas compressor is referred to as the forward end or direction, and the discharge end 98 is referred to as the aft end or direction, unless specified otherwise.

The centrifugal gas compressor 100 includes a housing 110, endcaps 150, a shaft 120, one or more bearing assemblies 200, and centrifugal impellers 122. Housing 110 may include an outer frame 116, a suction port 112, and a discharge port 114. Outer frame 116 may generally be a solid of revolution with a hollow interior, such as a hollow cylinder. The solid of revolution may be revolved about axis 295 and forms the hollow interior. Axis 295 may be aligned with and coaxial to center axis 95. Suction port 112 extends from outer frame 116 proximal the suction end 97. Discharge port 114 extends from outer frame 116 proximal the discharge end 98. Suction port 112 and discharge port 114 may each include a flange for connecting to inlet and outlet process gas piping respectively. An endcap 150 may be located at both the suction end 97 and the discharge end 98 within the outer frame 116. Each endcap 150 may be coupled to outer frame 116. Each endcap 150 may be a solid of revolution and may be configured to enclose an end of the centrifugal gas compressor 100.

The shaft 120 may also include a suction end and a discharge end associated with the suction end 97 and the discharge end 98 of the centrifugal gas compressor 100. The shaft 120 may be a single or dual shaft configuration. In a dual shaft configuration, shaft 120 may include a suction end stubshaft and a discharge end stubshaft.

Centrifugal impellers 122 may be coupled to shaft 120. The shaft 120 and attached elements, such as the centrifugal impellers 122, are supported by the one or more bearing assemblies 200. Bearing assemblies 200 may be located about shaft 120, radially outward from shaft 120, and radially inward from an endcap 150. Bearing assemblies 200 may be supported by an endcap 150.

During normal operation, process gas enters the centrifugal gas compressor 100 at the suction port 112. The process gas is compressed by one or more centrifugal impellers 122 mounted to the shaft 120 and diffused by one or more diffusers 124. The compressed process gas exits the centrifugal gas compressor 100 at a discharge port 114.

Figure 2:
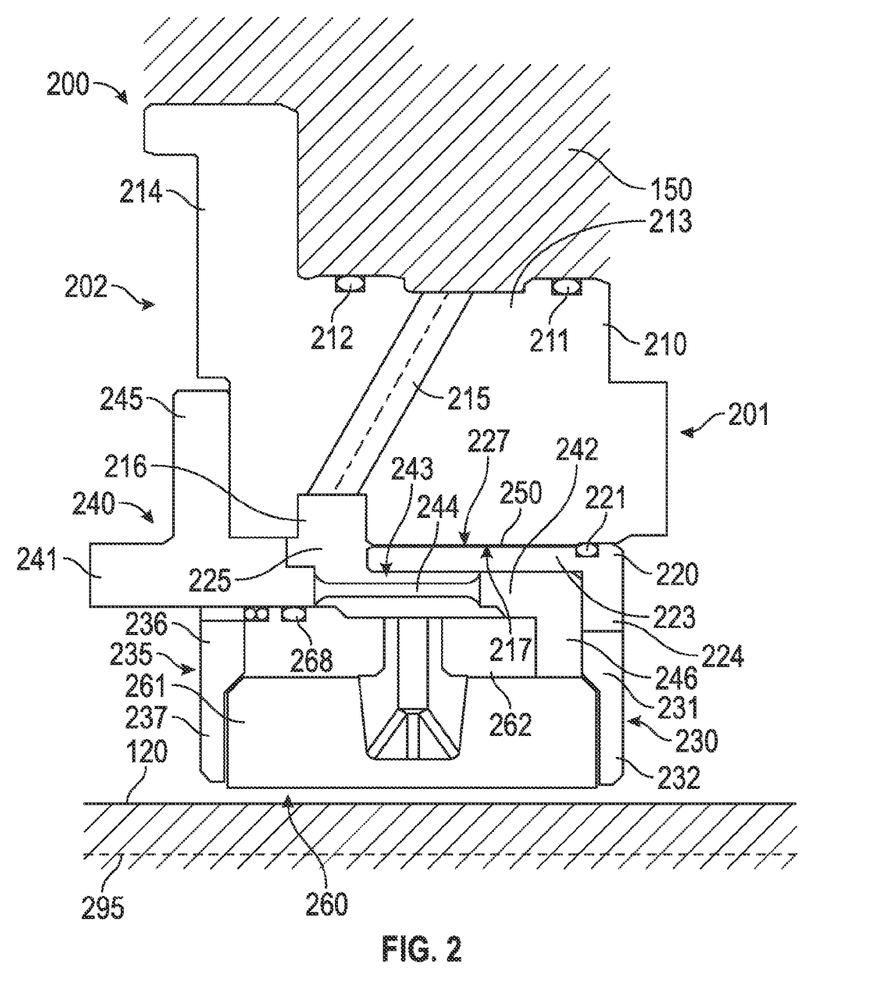
FIG. 2 is a cross-sectional view of the bearing assembly of FIG. 1.

FIG. 2 is a cross-sectional view of the bearing assembly 200 of FIG. 1. The bearing assembly 200 may include a bearing housing 210, a squeeze film cylinder 220, a squeeze film annulus 250, a damper spring 240, a first end plate 230, a second end plate 235, and a journal bearing 260. Bearing assembly 200 and all of its components may include an axis 295 that is concentric to center axis 95. All references to radial, axial, and circumferential directions and measures in regards to bearing assembly 200 refer to axis 295 and terms such as "inner" and "outer" generally indicate a lesser or greater radial distance from axis 295.

Bearing housing 210 may be generally located radially inward from endcap 150. Bearing housing 210 may be a solid of revolution. The hollow interior may be a cylindrical shape. Bearing housing 210 may include a housing body 213 and a housing flange 214. Housing body 213 may be a solid of revolution with a hollow interior, such as a hollow cylinder. Housing body 213 may be located radially inward from an endcap 150 and may be contiguous to an endcap 150. Housing body 213 may include a body surface 217, the radially inner surface of housing body 213. Housing body 213 may also include a first end 201 and a second end 202. A first direction may be the axial direction from the first end 201 to the second end 202 and a second direction may be the axial direction from the second end 202 to the first end 201. Housing flange 214 extends radially outward from housing body 213 and may extend from an axial end of housing body 213. In the embodiment illustrated, housing flange 214 extends from the second end 202.

Bearing housing 210 may also include an oil supply annulus 216 and one or more oil supply passages 215. Oil supply annulus 216 may be an annular slot formed in the interior of housing body 213. Oil supply annulus 216 may be adjacent body surface 217. Oil supply annulus 216 may radially extend into housing body 213 from the hollow interior of housing body 213. Oil supply annulus 216 is configured to supply oil circumferentially to the squeeze film annulus 250 and to the journal bearing 260. The one or more oil supply passages 215 extend radially through housing body 213 from oil supply annulus 216. In the embodiment illustrated, oil supply passages 215 are angled in the second direction as they extend radially through the housing body 213 from oil supply annulus 216. Oil supply passages 215 may be connected to an oil source that is configured to provide fresh oil for the squeeze film annulus 250 at all clocking and for the journal bearing 260.

One or more seals may be located radially between bearing housing 210 and an endcap 150. In the embodiment illustrated, a first housing seal 211 and a second housing seal 212 are located between bearing housing 210 and endcap 150. In the embodiment illustrated, first housing seal 211 is proximal first end 201, and second housing seal 212 is distal first end 201 and proximal housing flange 214; first housing seal 211 and second housing seal 212 are o-ring seals with the annulus for the o-ring seal located within housing body 213. In other embodiments, other configurations, such as the annulus for the o-ring seals being located in the endcap 150, and other types of seals may be used.

Squeeze film cylinder 220 is located within bearing housing 210, radially inward from housing body 213. In the embodiment illustrated in FIG. 2, squeeze film cylinder 220 is located axially between the axial location of oil supply annulus 216 and the axial location of first end 201. Squeeze film cylinder 220 includes a squeeze film cylindrical portion 223 and a squeeze film flange portion 224. Squeeze film cylindrical portion 223 generally includes a hollow cylinder shape. Squeeze film cylindrical portion 223 may extend from proximal the first end 201 toward the second end 202. In the embodiment illustrated, squeeze film cylindrical portion 223 extends along body surface 217 from proximal first end 201 at least to oil supply annulus 216. Squeeze film cylindrical portion 223 may partially overlap with oil supply annulus 216 in the axial direction. The axial length of squeeze film cylindrical portion 223 may be contained within the axial length of bearing housing 210.

Squeeze film cylindrical portion 223 may include a cylindrical portion surface 227, the outer surface of squeeze film cylindrical portion 223. Cylindrical portion surface 227 is radially adjacent to body surface 217 with at least a portion of cylindrical portion surface 227 being spaced apart from body surface 217 forming the squeeze film annulus 250 there between. Squeeze film annulus 250 is an annular slot.

In the embodiment illustrated, squeeze film cylindrical portion 223 is axially spaced apart from a first portion 242 of damper spring 240 forming a squeeze film passage 225 there between. The squeeze film passage 225 as illustrated is an annular passage contiguous to and in flow communication with oil supply annulus 216.

Squeeze film flange portion 224 may extend radially inward from squeeze film cylindrical portion 223 at the end of squeeze film cylindrical portion 223 and proximal first end 201. Squeeze film flange portion 224 and squeeze film cylindrical portion 223 may form an L-shaped cross-section. Squeeze film flange portion 224 may include an annular disk shape.

One or more seals may be located radially between squeeze film cylinder 220 and bearing housing 210. The embodiment illustrated includes a first squeeze film seal 221 adjacent squeeze film annulus 250, distal to oil supply annulus 216, and proximal first end 201. In the embodiment illustrated, first squeeze film seal 221 is an o-ring seal with the annulus for the o-ring seal located within squeeze film cylindrical portion 223. In other embodiments, other configurations, such as the annulus for the o-ring seal being located in the housing body 213, and other types of seals may be used. Squeeze film annulus 250 may extend axially from oil supply annulus 216 toward first squeeze film seal 221. In some embodiments, squeeze film annulus 250 may extend to first squeeze film seal 221

Damper spring 240 is primarily located within bearing housing 210. Damper spring 240 includes a first portion 242, a first flange 246, a second portion 241, a second flange 245, and a spring portion 243. First portion 242 may be located inward from squeeze film cylinder 220 and may be located within squeeze film cylinder 220. First portion 242 may be a hollow cylinder and may be axially contiguous to squeeze film flange portion 224 and may extend axially from squeeze film flange portion 224 towards second end 202. First portion 242 may also be radially contiguous to squeeze film cylindrical portion 223 and may be located axially within squeeze film cylindrical portion 223. First flange 246 may extend radially inward from first portion 242. First flange 246 and first portion 242 may form an L-shaped cross-section. First flange 246 may also be contiguous squeeze film flange portion 224. First flange 246 and squeeze film flange portion 224 may be fastened together.

Second portion 241 may include a hollow cylinder shape. Second portion 241 may be inward from bearing housing 210, such as radially inward from bearing housing 210, and may be partially located within and contiguous to bearing housing 210. The radial thickness of second portion 241 may be the combination of radial thicknesses of first portion 242 and squeeze film cylindrical portion 223. Second flange 245 may extend radially outward from second portion 241. Second flange 245 and second portion 241 may form a T-shaped cross-section. Second flange 245 may be axially adjacent bearing housing 210. Second flange 245 may be configured to fasten and secure damper spring 240 to bearing housing 210.

Spring portion 243 extends axially between first portion 242 and second portion 241. Spring portion 243 may be located completely within and internal to bearing housing 210, being both radially inward from bearing housing 210 and within an axial envelope defined by bearing housing 210. Spring portion 243 may also be located radially outward from journal bearing 260 and within an axial envelope defined by the axial width of journal bearing 260. Spring portion 243 may further be located within an axial envelope defined by the combined axial width of the squeeze film annulus 250 and the oil supply annulus 216.

Spring portion 243 may include damper spring fingers 244. Damper spring fingers 244 may be arranged in a circumferential pattern. Each damper spring finger 244 may include an elongated shape extending in the axial direction from the first portion 242 to the second portion 241. The elongated shape may be a cylinder, such as a circular cylinder or a right circular cylinder, or a prism, such a rectangular prism or a right rectangular prism.

Damper spring 240 may be a single integral piece of material. Damper spring 240 may be formed by machining the work piece to form the damper spring fingers 244 between the first portion 242 and the second portion 241.

First end plate 230 may extend radially inward from squeeze film flange portion 224. First end plate 230 may be an annular plate. First end plate 230 may include a first thickened portion 231 that radially aligns with first flange 246 and is configured to fasten to first flange 246. First end plate 230 may also include first plate portion 232 extending radially inward from the first thickened portion 231.

Second end plate 235 may be an annular plate located radially inward from second portion 241. In embodiments, second end plate 235 may be radially contiguous to second portion 241. Second end plate 235 may be located axially distal to first end plate 230 within bearing housing 210. Second end plate 235 may include a second thickened portion 236 adjacent second portion 241 and a second plate portion 237 extending radially inward from the second thickened portion 236.

Journal bearing 260 may be located within bearing housing 210 and radially inward from damper spring 240. Journal bearing 260 may also be located axially between first end plate 230 and second end plate 235. Journal bearing 260 includes a journal housing 262. Journal housing 262 may include a hollow cylinder shape and may be located within damper spring 240. Journal housing 262 may radially align with and extend axially between first flange 246 and second thickened portion 236. Journal housing 262 may also fasten to both first flange 246 and second thickened portion 236. In one embodiment, the fastener configured to fasten first flange 246 and first thickened portion 231 together is configured to extend through first flange 246 and fasten journal housing 262 to first flange 246.

In the embodiment illustrated, journal bearing 260 includes journal tilt pads 261 arranged in a circumferential pattern. Each journal tilt pad 261 is located radially inward from journal housing 262 and extends axially between first end plate 230 and second end plate 235. Journal tilt pads 261 are also located radially adjacent shaft 120. While the journal bearing 260 is shown in FIG. 2 is a tilt pad journal bearing, other types of journal bearings, such as ball bearings, may also be used.

One or more seals may be located radially between journal housing 262 and second portion 241. In the embodiment illustrated, bearing assembly 200 includes three journal seals 268 between journal housing 262 and second portion 241. In the embodiment illustrated, journal seals 268 are o-ring seals with the annulus for the o-ring seal located within journal housing 262. In other embodiments, other configurations, such as the annulus for the o-ring seals being located in the second portion 241, and other types of seals may be used.

Figure 3:
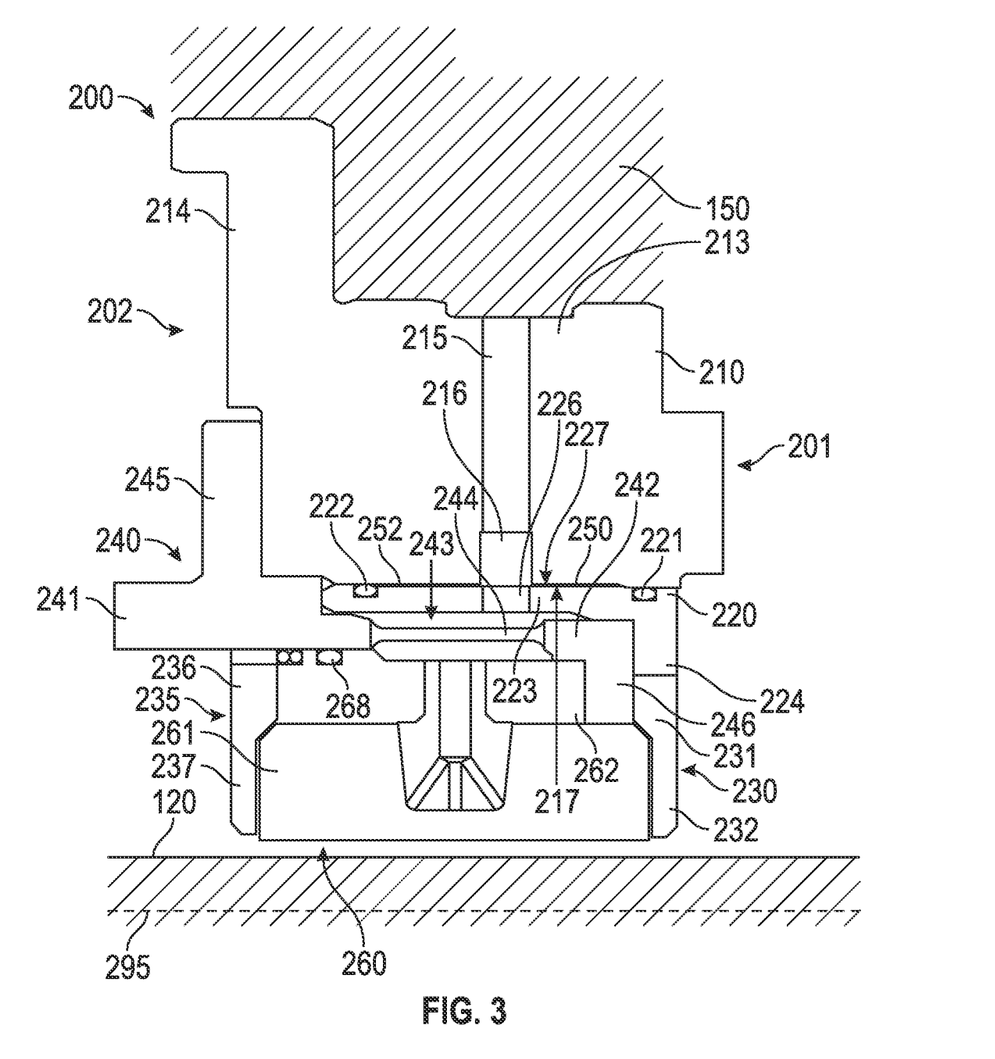
FIG. 3 is a cross-sectional view of an alternate embodiment of the bearing assembly of FIG. 2.

FIG. 3 is a cross-sectional view of an alternate embodiment of the bearing assembly 200 of FIG. 2. FIG. 2 illustrates an asymmetric squeeze film configuration of bearing assembly 200, while FIG. 3 illustrates a symmetric squeeze film configuration of bearing assembly 200. In the embodiment illustrated in FIG. 3, oil supply annulus 216 is more centrally located in the axial direction within bearing housing 210. In the symmetrical configuration, squeeze film cylindrical portion 223 may axially extend beyond oil supply annulus 216 and may extend up to/adjacent to second portion 241. The symmetrical configuration may include multiple squeeze film passage features 226 extending through squeeze film cylindrical portion 223. The squeeze film passage features 226 may be radially extending holes/passages contiguous to and in flow communication with oil supply annulus 216.

The symmetric configuration may also include a second squeeze film seal 222 located radially between squeeze film cylinder 220 and bearing housing 210. In the embodiment illustrated second squeeze film seal 222 is proximal second end 202, adjacent second portion 241, and distal to oil supply annulus 216, opposite first squeeze film seal 221.

Similar to the asymmetric squeeze film configuration of FIG. 2, the symmetric squeeze film configuration includes a squeeze film annulus 250 extending axially oil supply annulus 216 toward first squeeze film seal 221. The symmetric squeeze film configuration also includes a second squeeze film annulus 252 extending axially from oil supply annulus 216 toward second squeeze film seal 222. In some embodiments, squeeze film annulus 250 may extend to first squeeze film seal 221, and second squeeze film annulus 252 may extend to second squeeze film seal 222.

In the symmetric squeeze film configuration, such as the embodiment illustrated in FIG. 3, spring portion 243 maybe located within squeeze film cylinder 220 being radially inward from squeeze film cylindrical portion 223 and within the axial envelope defined by the axial length of cylindrical portion 223.

Figure 4:
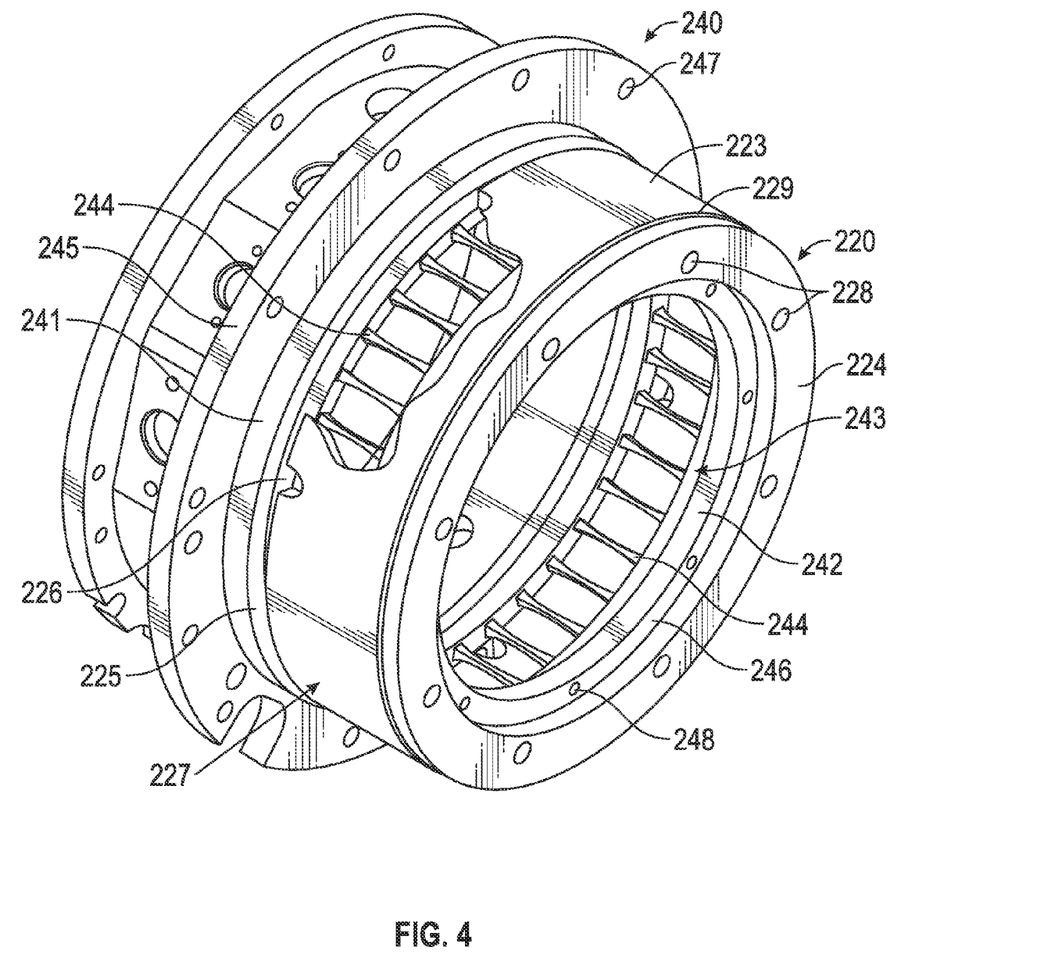
FIG. 4 is a perspective view of an alternate embodiment of the damper spring and the squeeze film cylinder of FIG. 2.

FIG. 4 is a perspective view of an alternate embodiment of the damper spring 240 and the squeeze film cylinder 220 of FIG. 2. A portion of the squeeze film cylinder 220 is cutaway showing the damper spring 243 and the spring fingers 244 arranged in a circumferential pattern. In the embodiment illustrated, the elongated shape of the damper spring fingers 244 thicken by flaring out at each end. The cross-section of each spring finger 244 may be circular, square, rectangular, or other geometric patterns.

In the embodiment illustrated, squeeze film cylinder 220 includes a squeeze film seal slot 229 extending radially inward from cylindrical portion surface 227. Squeeze film seal slot 229 may be an annular slot. The embodiment illustrated in FIG. 4 also includes squeeze film passage features 226. Squeeze film passage features 226 may be slots or holes located proximal squeeze film passage 225. Squeeze film passage features 226 may allow a controlled amount of oil to pass from oil supply passage 215 to damper spring 243. In the embodiment illustrated, squeeze film passage features 226 are circumferentially spaced apart with each squeeze film passage feature 226 being a semi-circular slot extending into squeeze film cylindrical portion 223 from squeeze film passage 225.

As illustrated, squeeze film flange portion 224 may include squeeze film flange bolt holes 228 circumferentially spaced about squeeze film flange portion 224 and extending through squeeze film flange portion 224 in the axial direction. First flange 246 may include first flange bolt holes 248 circumferentially spaced apart about first flange 246 and extending through first flange 246 in the axial direction. Second flange 245 may include second flange bolt holes 247 circumferentially spaced apart about second flange 245 and extending through second flange 245 in the axial direction.

The components of the bearing assembly 200 may be made of alloyed steels, such as chrome moly.

INDUSTRIAL APPLICABILITY

Gas compressors such as centrifugal gas compressor 100, are used to move process gas from one location to another. Gas compressors are often used in the oil and gas industries to move natural gas in a processing plant or in a pipeline. Gas compressors are driven by gas turbine engines, electric motors, or any other power source.

The shaft 120 of centrifugal gas compressor 100 is connected to and rotated by the power source. The shaft 120 is supported by one or more bearing assemblies 200. Bearing assemblies 200 support the radial load of centrifugal gas compressor 100.

Bearing assemblies 200 are also configured to dampen vibrations during operation of the centrifugal gas compressor 100. Journal bearings, such as tilt pad journal bearings may not provide enough damping. A squeeze film damper and a damper spring may be included in the bearing assembly 200 to provide further dampening. The damper spring may also be referred to as a squirrel cage. The addition of a damper spring may more than double the axially length of a bearing assembly. Damper spring 240 with the spring portion 243 located within the bearing housing 210 may reduce the axial footprint of a bearing assembly, such as bearing assembly 200.

A squeeze film configuration, such as the asymmetric squeeze film configuration and the symmetric squeeze film configurations disclosed herein may also be included to provide even further damping. Squeeze film, such as oil, is pressurized and floods the squeeze film annulus(es). When the squeeze film cylinder 220 moves, the squeeze film migrates axially and circumferentially creating the desired damping effect.

An asymmetric configuration may allow for a squeeze film annulus with a larger radial height. Squeeze film damper with a larger radial height may be less sensitive to manufacturing tolerances and deflection of the various components. The asymmetric configuration may also allow for a longer axial length of the squeeze film annulus as compared to a symmetric configuration, allowing for increased damping.

The preceding detailed description is merely exemplary in nature and is not intended to limit the invention or the application and uses of the invention. The described embodiments are not limited to use in conjunction with a particular type of centrifugal gas compressor. Hence, although the present disclosure, for convenience of explanation, depicts and describes a particular bearing assembly, it will be appreciated that the bearing assembly in accordance with this disclosure can be implemented in various other configurations, can be used with various other types of gas compressors, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A bearing assembly for a rotary machine, the bearing assembly comprising:
    a bearing housing including
        a housing body, the housing body being a solid of revolution with a hollow interior, the housing body including
            a first end, and
            a second end opposite the first end;
    a squeeze film cylinder located within the bearing housing, the squeeze film cylinder including a squeeze film cylindrical portion extending from proximal the first end towards the second end, the squeeze film cylindrical portion having a cylindrical shape;
    a damper spring including
        a first portion having a cylindrical shape concentric with the squeeze film cylinder and proximal the first end,
        a second portion having a cylindrical shape concentric with the squeeze film cylinder and proximal the second end, and
        a spring portion having a plurality of damper spring fingers arranged in circumferential pattern concentric with the squeeze film cylinder and extending axially between the first portion and the second portion, the spring portion being located completely within the bearing housing; and
    a journal bearing located within the bearing housing.

2. The bearing assembly of claim 1, wherein:
    the bearing housing also includes
        an oil supply annulus formed in the housing body at the hollow interior, and
        one or more oil supply passages extending outward from the oil supply annulus and through the housing body; and
    the squeeze film cylindrical portion extends at least to the oil supply annulus, and the bearing housing and the squeeze film cylindrical portion form a squeeze film annulus there between extending from the oil supply annulus toward the first end.

3. The bearing assembly of claim 2, further comprising a first squeeze film seal located between the bearing housing and the squeeze film cylindrical portion and proximal the first end, and wherein the squeeze film annulus extends to the first squeeze film seal.

4. The bearing assembly of claim 2, wherein the squeeze film cylindrical portion extends beyond the oil supply annulus to the second portion, and the bearing housing and the squeeze film cylindrical portion form a second squeeze film annulus there between extending from the oil supply annulus toward the second end.

5. The bearing assembly of claim 4, further comprising:
a first squeeze film seal located between the bearing housing and the squeeze film cylindrical portion and proximal the first end; and
a second squeeze film seal located between the bearing housing and the squeeze film cylindrical portion and proximal the second end;
wherein the squeeze film annulus extends to the first squeeze film seal and the second squeeze film annulus extends to the second squeeze film seal.

6. The bearing assembly of claim 1, wherein each damper spring finger of the plurality of damper spring fingers has a cylindrical shape extending axially between the first portion and the second portion.

7. The bearing assembly of claim 1, wherein the journal bearing is a tilt pad journal bearing.

8. The bearing assembly of claim 1, wherein:
the first portion is located inward from the squeeze film cylindrical portion;
the second portion is located inward from the bearing housing;
the squeeze film cylinder also includes a squeeze film flange portion extending inward from the squeeze film cylindrical portion proximal the first end; and
the damper spring also includes
a first flange extending inward from the first portion, the first flange being contiguous to and fastened to the squeeze film flange portion, and
a second flange extending outward from the second portion, the second portion being contiguous to and fastened to the bearing housing.

9. The bearing assembly of claim 8, further comprising:
a first end plate extending inward from the squeeze film flange portion and being fastened to the first flange, the first end plate including an annular plate shape; and
a second end plate extending inward from the second portion and being fastened to the journal bearing;
wherein the journal bearing is located between the first end plate and the second end plate; and
wherein the journal bearing is also fastened to the first flange.

10. A centrifugal gas compressor including the bearing assembly of claim 1, the centrifugal gas compressor further comprising a shaft and centrifugal impellers coupled to the shaft, wherein the bearing assembly is located about the shaft.

11. A bearing assembly for a rotary machine, the bearing assembly comprising:
a bearing housing including
a housing body, the housing body being a solid of revolution revolved about an axis forming a hollow interior, the housing body including
a first end,
a second end opposite the first end, and
a body surface, the body surface being the radially inner surface of the housing body,
an oil supply annulus, the oil supply annulus being an annular slot formed in the housing body extending radially inward from the body surface, and
one or more oil supply passages extending outward from the oil supply annulus and through the housing body;
a squeeze film cylinder located within the bearing housing, the squeeze film cylinder including
a squeeze film cylindrical portion extending axially from proximal the first end to at least the oil supply annulus, the squeeze film cylindrical portion including a hollow cylinder shape and including a cylindrical portion surface, the cylindrical portion surface being the radially outer surface of the squeeze film cylindrical portion,
wherein at least a portion of the cylindrical portion surface is spaced apart from the body surface forming a squeeze film annulus there between, the squeeze film annulus being an annular slot extending from the oil supply annulus towards the first end, and
a squeeze film flange portion extending radially inward from the squeeze film cylindrical portion proximal the first end;
a damper spring including
a first portion located within and contiguous to the squeeze film cylindrical portion,
a first flange extending radially inward from the first portion and contiguous to the squeeze film flange portion,
a second portion proximal the second end and located at least partially within the bearing housing,
a second flange extending radially outward from the second portion and contiguous to the second end, and
a spring portion extending axially between the first portion and the second portion, the spring portion being axially located within an axial envelope defined by a combined width of the oil supply annulus and the squeeze film cylindrical portion; and
a journal bearing located radially inward from the damper spring, the journal bearing including a journal housing.

12. The bearing assembly of claim 11, wherein the squeeze film cylindrical portion is axially spaced apart from the second portion forming a squeeze film passage there between, the squeeze film passage being in flow communication with the oil supply annulus.

13. The bearing assembly of claim 11, further comprising a squeeze film seal located between the bearing housing and the squeeze film cylindrical portion and proximal the first end, and wherein the squeeze film annulus extends to the squeeze film seal.

14. The bearing assembly of claim 11, wherein the spring portion includes a plurality of damper spring fingers arranged in a circumferential pattern, each damper spring finger including a cylindrical or prism shape extending axially between the first portion and the second portion.

15. A centrifugal gas compressor including the bearing assembly of claim 11, the centrifugal gas compressor further comprising a shaft and centrifugal impellers coupled to the shaft, wherein the bearing assembly is configured to support the shaft and the centrifugal impellers.

16. A bearing assembly for a rotary machine, the bearing assembly comprising:
a bearing housing including
a housing body, the housing body being a solid of revolution revolved about an axis forming a hollow interior, the housing body including
a first end,
a second end opposite the first end, and a body surface, the body surface being the radially inner surface of the housing body, an oil supply annulus, the oil supply annulus being an annular slot formed in the housing body extending radially inward from the body surface, and one or more oil supply passages extending outward from the oil supply annulus and through the housing body;

a squeeze film cylinder located within the bearing housing, the squeeze film cylinder including a squeeze film cylindrical portion extending axially from proximal the first end toward the second end beyond the oil supply annulus, the squeeze film cylindrical portion including a hollow cylinder shape and including a cylindrical portion surface, the radially outer surface of the squeeze film cylindrical portion, wherein at least a portion of the cylindrical portion surface is spaced apart from the body surface on each side of the oil supply annulus forming a squeeze film annulus and a second squeeze film annulus there between, the squeeze film annulus being an annular slot extending from the oil supply annulus towards the first end and the second squeeze film annulus being a second annular slot extending from the oil supply annulus towards the second end, one or more squeeze film passage features extending radially through the squeeze film cylindrical portion, the one or more squeeze film passage features being contiguous to the oil supply annulus, and a squeeze film flange portion extending radially inward from the squeeze film cylindrical portion proximal the first end;

a damper spring including a first portion located within and contiguous to the squeeze film cylindrical portion, a first flange extending radially inward from the first portion and contiguous to the squeeze film flange portion, a second portion proximal the second end and located at least partially within the bearing housing, a second flange extending radially outward from the second portion and contiguous to the second end, and a spring portion extending axially between the first portion and the second portion, the spring portion being axially located within an axial envelope defined by the squeeze film cylindrical portion; and a journal bearing located radially inward from the damper spring, the journal bearing including a journal housing.

17. The bearing assembly of claim 16, further comprising:

a first squeeze film seal located between the bearing housing and the squeeze film cylindrical portion and proximal the first end; and a second squeeze film seal located between the bearing housing and the squeeze film cylindrical portion and proximal the second end;

wherein the squeeze film annulus extends to the first squeeze film seal and the second squeeze film annulus extends to the second squeeze film seal.

18. The bearing assembly of claim 17, wherein the first squeeze film seal and the second squeeze film seal are o-ring seals.

19. The bearing assembly of claim 16, wherein the spring portion includes a plurality of damper spring fingers arranged in a circumferential pattern, each damper spring finger including a cylindrical or prism shape extending axially between the first portion and the second portion.

20. A centrifugal gas compressor including the bearing assembly of claim 16, the centrifugal gas compressor further comprising a shaft and centrifugal impellers coupled to the shaft, wherein the bearing assembly is located radially outward from the shaft.

* * * * *